(12) United States Patent
Burns

(10) Patent No.: US 6,520,006 B2
(45) Date of Patent: Feb. 18, 2003

(54) REMOTE PRESSURE INDICATOR FOR SEALED VESSELS INCLUDING VEHICLE TIRES

(75) Inventor: Alan Alexander Burns, Portola Valley, CA (US)

(73) Assignee: MLHO, Inc., Portola Valley, CA (US)

( * ) Notice: Subject to any disclaimer, the term of this patent is extended or adjusted under 35 U.S.C. 154(b) by 0 days.

(21) Appl. No.: 09/922,395

(22) Filed: Aug. 2, 2001

(65) Prior Publication Data

US 2002/0038570 A1 Apr. 4, 2002

Related U.S. Application Data

(60) Provisional application No. 60/224,568, filed on Aug. 10, 2000.

(51) Int. Cl.[7] .......................... E01C 23/00; G01M 17/02
(52) U.S. Cl. ..................................................... 73/146
(58) Field of Search ........................ 73/386, 146–146.8, 73/728, 708; 340/447, 448

(56) References Cited

U.S. PATENT DOCUMENTS

| | | | |
|---|---|---|---|
| 4,667,514 A | * | 5/1987 | Baer ............................. 73/386 |
| 4,807,468 A | * | 2/1989 | Galen ......................... 73/146.5 |
| 5,717,135 A | * | 2/1998 | Floretta et al. ............. 73/146.5 |

* cited by examiner

Primary Examiner—William Oen
Assistant Examiner—Marissa Ferguson
(74) Attorney, Agent, or Firm—David E. Newhouse, Esq.

(57) ABSTRACT

A compact, robust, and inexpensive magnetically coupled pressure gauge includes a spiral-faced or helical bellows coupled for rotating a magnetic field source (permanent magnet) within a pressure vessel the orientation of which is externally sensed and correlated to pressure within the pressure vessel. Mechanisms of extraneous magnetic field compensation are discussed Applications contemplated include measuring pressure in pressure vessels and pressure of pneumatic vehicle tires without breaching the integrity of the particular pressurized vessels. Embodiments included a visual, manual tire pressure monitoring system.

23 Claims, 9 Drawing Sheets

REMOTE PRESSURE INDICATOR FOR SEALED VESSELS INCLUDING VEHICLE TIRES

CROSS-REFERENCES TO RELATED APPLICATIONS

This application is a continuation of Provisional Application No. 60/224,568 filed Aug. 10, 2000.

BACKGROUND—Field of Invention

This invention relates to remote pressure sensing using permanent magnets rotated mechanically by spiral-faced and helical bellows from within sealed vessels, including tires, and exterior sensors responding to magnetic field direction.

BACKGROUND—Description of Prior Art

Fluor Hanford, Inc. has developed a passive, magnetically-coupled pressure readout system based on a Bourdon-tube mechanism rotating a permanent magnet within a pressure vessel. Bourdon tube mechanisms are fragile, complex, and are not suited for driving appreciable magnet masses nor for overcoming appreciable friction. The latter disadvantages stem from the fact Bourdon mechanisms are relatively weak force wise. In fact, forces generated by the interaction of the earth's magnetic field with a common permanent magnet can exceed those available from Bourdon tube mechanisms.

The Fluor Hanford device is designed for stationary applications, (spent nuclear fuel canisters) does not contemplate any necessity to compensate for errors due to extraneous magnetic fields. In fact, the device uses a conventional, horizontally oriented, gravity stabilized magnetic compass needle supported by a single-jewel suspension to sense the orientation of the magnet within the pressure vessel.

Angular coupling between rotating elements on shafts via magnetic fields is well known. U.S. Pat. No. 5,382,792 Hurst et al, describes a coupling mechanism wherein permanent magnet pairs are incorporated into coaxial shafts to provide an instantaneous indication of the orientation of a rotating shaft internal to a motor vehicle engine. Such coupling mechanisms employ multiple permanent magnets, oriented pole-face to pole-face. In these types of devices, magnetic coupling between the pole faces of paired permanent magnets aligns the "output" shaft with the "input" shaft. To be effective, such mechanisms require narrow gaps between the pole faces of the respective magnets. These types of devices are hermetically encapsulated for protection from environmental debris and require penetration through the engine wall.

U.S. Pat. No. 3,777,565, Munier et al. describes a sealed water or fluid meter with continuously rotating permanent magnets driven by impellers on input shafts magnetically coupled to magnets on outputs shafts for inducing synchronized rotation. The rotation per unit time of the output shaft indicates the flow rate. Angular displacements (errors) between the "input" and "output" shafts are tolerated and even increase torque coupling from the input magnet to the Output magnet.

Numerous devices include mechanisms moving a permanent magnet in response pressure or other force to induce a sensed effect in a material responsive to variation in magnetic field strength. For example, U.S. Pat. No. 4,006,402 Mincuzzi, U.S. Pat. No. 4,843,886 Koppers, et al, and U.S. Pat. No. 4,627,292 Dekrone, each describe a device based on either magnetoresistance and magnetic saturation. U.S. Pat. No. 4,339,955, Iwasaki describes a mechanism that exploits variation in the incremental permeability of a magnetically soft material. Devices based on the sensing the strength of a magnetic field rather than field direction typically require a narrow spacing between the sensor and magnet and are very sensitive to changes in spacing, small misalignments, and extraneous magnetic fields. Accordingly, such devices generally require careful and extensive calibration before measurements are made.

U.S. Pat. No. 4,866,982, Gault describes a tire pressure monitoring system where a stationary Hall-effect sensor measures spacing between a fixed magnet and a second magnet moveable in response to a linear pressure actuator. Changes in spacing between the magnets affect features of the combined magnetic field pattern. Variation in the combined pattern is determined from signal waveforms generated as the spaced magnets, rotating with a wheel, sweep by a stationary sensor. This device requires close coupling between magnet and sensor and penetration into the pressurized interior of the tire and rim.

U.S. Pat. No. 5,814,725, Furuichi et al. describes a mechanism that penetrates through a tire rim wherein a piston-driven screw rotates a permanent magnet. The strength of the magnetic field is detected by a stationary Hall-effect sensor that is mounted transversely to the magnet rotation axis. This type of device typically shares the same problems as the other devices that depend on sensing magnetic field strength.

U.S. Pat. No. 5,047,629, Geist describes a hermetically sealed mechanism for sensing linear displacements of a ferromagnetic armature (e.g., a single turn in a coil spring) according to the attractive force on freely rotating magnet. Disadvantages inherent in this type of device relate to the small distances required between the armature and the magnet, to the small amount of rotational displacement of the magnet produced, and to inadvertent magnetization of the armature.

Other examples of remote pressure reporting mechanisms involve changes in electromagnetic induction or inductive coupling between active elements. For example, U.S. Pat. No. 5,455,508, Takahashi utilizes a form of time-varying (alternating current) electrical excitation. Disadvantages of these types of devices relate to the need to provide a source of operating power within the pressure container and to inadvertent production of eddy currents in nearby conductive materials that will distort the desired field. These types of devices do not sense magnetic field direction.

Still other concepts of remote pressure sensing involve a change the state indicator responding a preset pressure level. For example, U.S. Pat. No. 3,946,175, Sitabkhan describes switching a magnetically susceptible reed in response to pressure actuated displacement of a magnet. U.S. Pat. No. 5,542,293, Tsuda et al. describes a conventional bellows actuated mechanism that uses a fixed and a moveable magnet to switch the orientation of a third magnet. U.S. Pat. No. 5,717,135, Fioretta et al. describes use of magnetic coupling to switch the state of a transducer from producing to not producing a signal. These types of mechanisms are incapable of producing a continuous output responsive to pressure.

Other examples of remote monitoring of vehicle tire pressure involve wireless or telemetric transmission of data. For example, U.S. Pat. No. 5,960,804 McClelland describes a radio transmitter that sends data collected and stored in a memory device within a tire to an external receiver. This active device requires a source of electrical energy (a battery) inside the tire. Alternatively, U.S. Pat. No. 6,053,038 Schramm et al. proposes an external oscillator circuit for generating electromagnetic signals coupling to and energizing a second oscillator within the tire, which changes state responsive to tire pressure and/or other sensed parameters.

Several mechanisms besides Bourdon tubes have been proposed for converting pressure or force into rotary motion. For example, U.S. Pat. No. 4,307,928 Petlock describes a helical bellows for imparting rotational displacement when compressed mechanically in order to make an improved electrical contact. A single, high pitch helical lead is employed because the desired rotational translation is small. U.S. Pat. No. 5,103,670 Wu describes the use of a helical screw to convert linear displacement from a conventional bellows to actuate a directly viewed rotary dial or pointer. U.S. Pat. No. 6,082,170 Lia et al. describes a blood pressure apparatus that uses a diaphragm bellows and a compressible helical ribbon spring to rotate a dial pointer. None of these types of device employs magnetic coupling for remote sensing.

SUMMARY

The invented magnetically coupled pressure gauge comprises an internal sender having a spiral-faced or helical bellows coupled for rotating a permanent magnet and an external magnetic sensor responding to magnetic field direction provided by the sender. The invented gauge is particularly suited for remotely measuring pressure within sealed vessels, including vehicle tires, without requiring any penetration through the containing walls of the pressure vessel.

For vehicular applications, a sender secured within a pneumatic tire sweeps past stationary magnetic sensors as the tire rotates. Suitable sensors include induction coils generating signals responsive to the moving magnetic field, and as well, magneto-resistive and/or Hall effect type devices generating signals indicative of magnetic field direction. The orientation of the sender magnet, and hence the pressure, are obtained from the waveforms produced by the induction coils, the magnetoresistive device, or the Hall effect device. In applications where there is little or no relative motion between the pressure sender and the magnetic field direction sensor, magneto-resistive and Hall effect devices are preferable.

Advantages

The invented magnetically coupled pressure gauge is both robust and economical for remotely measuring, indicating, and monitoring pressure inside a pressure vessel without requiring penetration of the confining walls of the vessel or use an internal power source. In particular, the invented gauge provides passive, non-powered, readout of internally sensed pressure outside a pressure vessel.

Other novel aspects of the invented magnetically coupled pressure gauge relate to mechanisms of compensation for extraneous magnetic fields.

Still other novel aspects of the invented magnetically coupled pressure gauge relate to the pressure responsive mechanisms producing torque for rotating a permanent magnet within a pressure vessel. In particular, the invented gauge provides accurate, remote measurement of pressure over large ranges.

The invented magnetically coupled pressure gauge is particularly suited for passive monitoring of tire pressure within pneumatic tires of motor vehicles. In particular, the invented magnetically coupled pressure gauge can significantly enhance traffic safety in that tire-pressure monitoring and measurement requirements are reduced to operator observation.

Still further advantages of the invented magnetically coupled pressure gauge will become apparent from a consideration of the ensuing description and accompanying drawings.

DRAWING FIGURES

Figure 1:
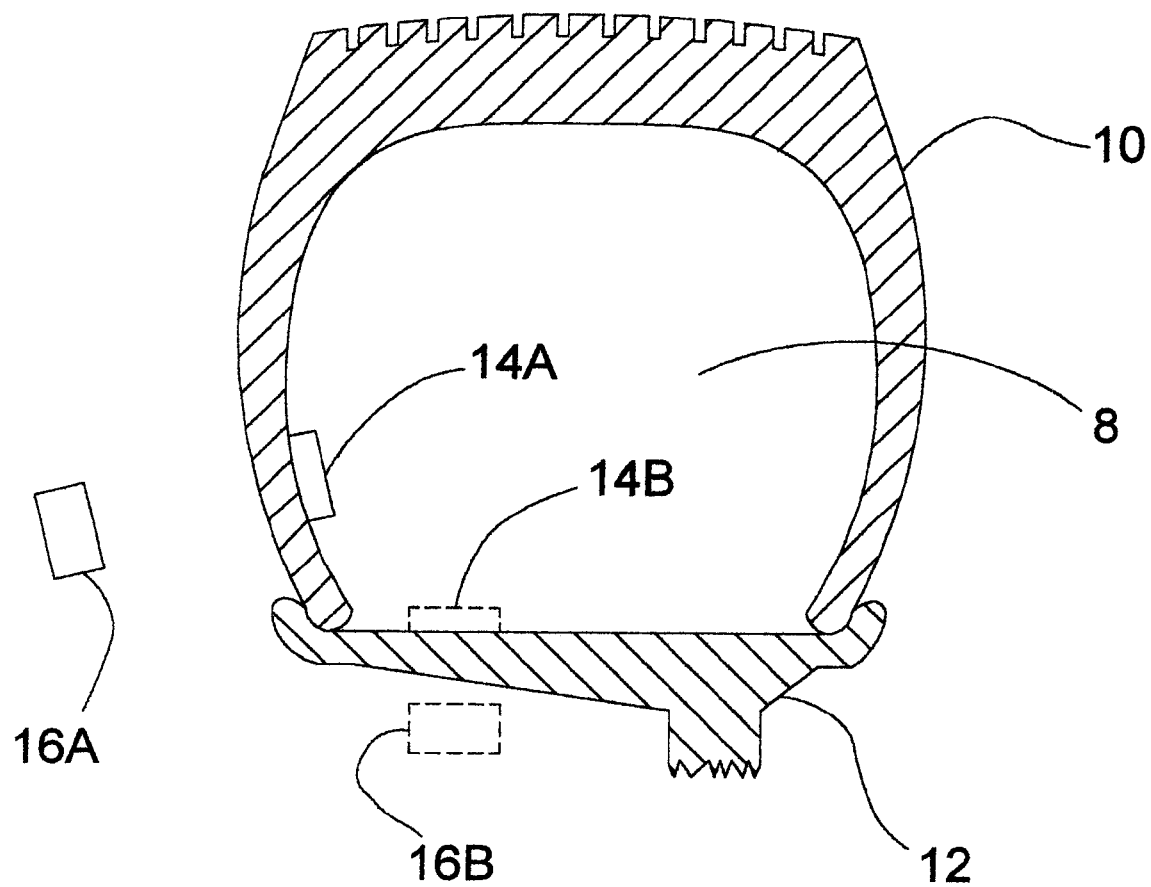
FIG. 1 is a cross section view of a preferred embodiment of the invented magnetically coupled pressure gauge with tire- and rim-mounted magnetic field pressure senders coupling to stationary magnetic field direction sensors.

REFERENCE NUMERALS IN DRAWINGS 10 vehicle tire
12 wheel rim
14A–H pressure sender
16A–F pressure reader
18 helical bellows
20 sender case
21 sealed sender container
22 distal end bellows
23 proximate end bellows
24 cover plate
25 annular bearing shoulder
26 bushing
28 end hole 30A–C pressure vessel wall
32 helical corrugations
34 slotted shaft
36 end bore
38 support shaft
40 alignment pin
42 support plate
44 longitudinal slot
46 sender magnet
48 compression bearing
50 thrust bearing
52 induction coils
54 electrical connections
56 enclosure
58 indicial mark
59 indicial mark
60 indicial mark
62 reader casing
64 reader cover
66 aft bearing
68 fore bearing
70 reader shaft
72–72B reader magnet
73 pointer
74A–D sender magnet
75 dial markings
76 sender case
78A–B sender cover
77A–B sender casing
80A–B spiral-faced bellows
82 spiral stiffeners
84A–B hub
86 longitudinal stiffeners
88A–B hole
90 mounting end hole
92 bearing
94 sender shaft
96A–B magnet support plate
98 bearing
100 pin
102 diametrical slot
106 A–B indicial mark
107 integral shaft
108 flexible spider
110 spoke
112 thrust bearing
128 torsion spring
130A–B flux-guiding structures
132A–B high-permeability elements
134A–B low-permeability elements
136 vehicle tire
138 wheel rim
140 raised ring
142 indicial mark DESCRIPTION—Preferred and Exemplary Embodiment FIG. 1 schematically illustrates the invented magnetically coupled pressure gauge, showing in cross section a pressure vessel comprising a vehicle tire 10 and wheel rim 12 with a pressure sender unit 14A and pressure reader unit 16A. Sender unit 14A is shown permanently attached to, or incorporated as a part of the interior sidewall surface of the tire 10. The pressure sender unit 14A contains a permanent magnet (not shown) rotated in response to pressure within the pressure vessel/tire 10 that provides a magnetic field external the pressure vessel or tire sidewall oriented in direction corresponding to its orientation within the pressure vessel/tire 10. Alternatively, (or in addition) a similar sender 14B (shown in phantom) could be permanently attached to, or incorporated as a part of the wheel rim 12. (The relative sizes of senders 14A/14b are exaggerated for clarity.) In practice, the sender unit would be sufficiently small so as to negligibly affect tire balance. Any part of the interior surface of the tire may support the pressure sender 14A, including the underside of the tread. For other applications, Pressure senders (14A &14B) can be permanently attached to, or incorporated into the walls of any pressure vessel.

Magnetic reader units 16A and/or 16B are mounted on non-rotating parts of the wheel hub, axle, brake mechanism, vehicle frame, or the like, so that they will be aligned, substantially coaxially with the corresponding sender units 14A and/or 14B once per wheel rotation. Only one sender-reader combination need be installed per tire, wheel, or other pressure vessel. Sender unit(s) 14A/14B are completely enclosed within the pressure vessel and the corresponding reader unit(s) 16A/16B are completely outside of or external the pressure vessel. While preferred, sender unit(s) 14A/14B need not be in mechanically coupled to the vessel wall particularly if it is stationary. However, where relative movement is expected between the vessel wall and the corresponding mounted reader units 16A/16B, the sensors should be located to not come into contact with the vessel wall. In fact, by appropriately choosing components capable of providing magnetic field strength and sensor sensitivity, the spacing distances between senders and readers can be relatively substantial. Both sender unit(s) 14A/14B and reader unit(s) 16A/16B are preferably composed of non- or weakly-magnetic materials.

Figure 2:
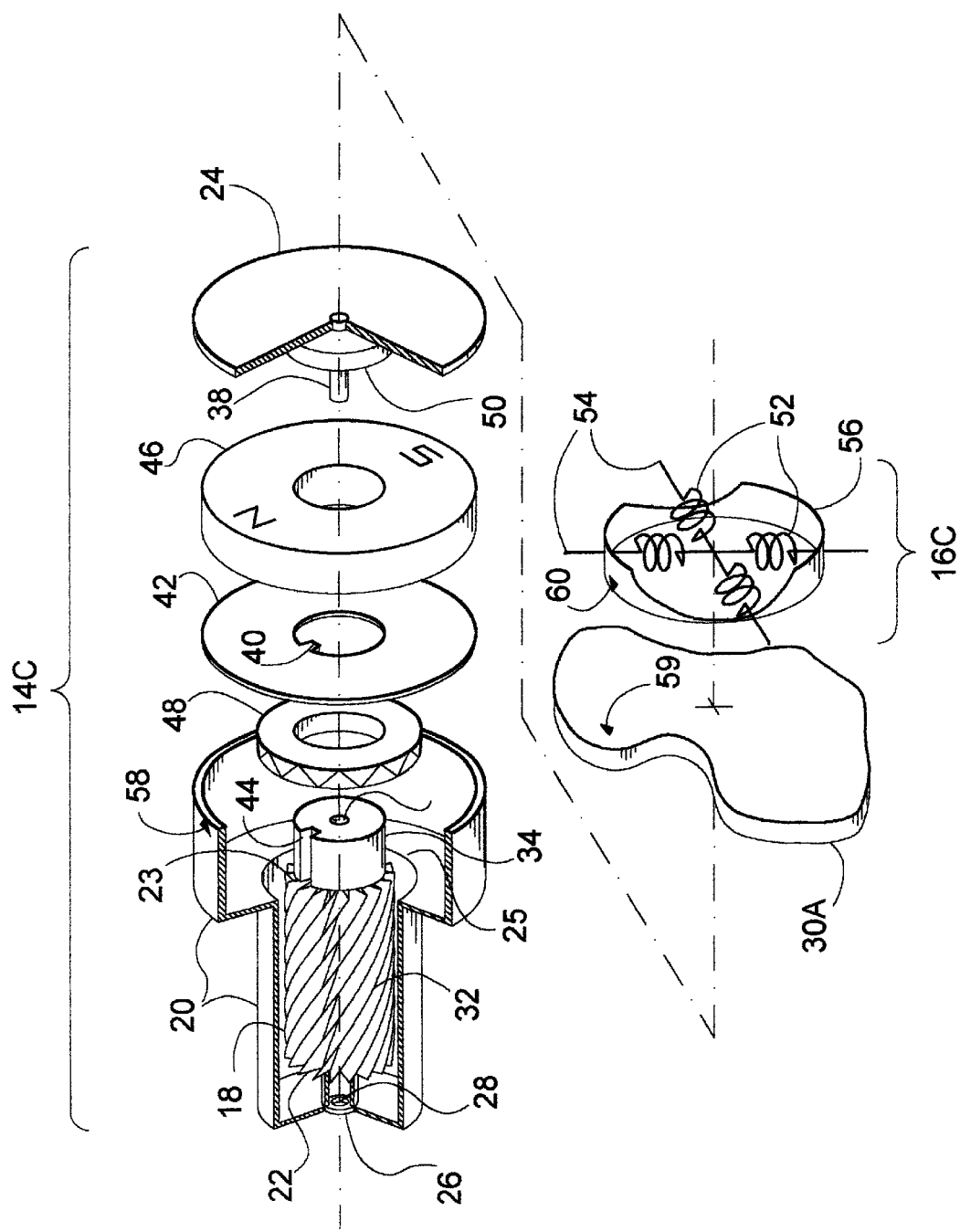
FIG. 2 is an overall exploded and cut away perspective view of an embodiment of the invented magnetically coupled pressure gauge employing an internal multi-lead helical bellows rotating an internal magnet as a pressure transducer and external crossed induction coils for sensing magnetic field direction.

FIG. 2 shows an exploded and cut away perspective view of an embodiment of the invented magnetically coupled pressure gauge with a sender unit 14C utilizing a hermetically sealed helical bellows 18 mounted within an evacuated or pressurized hermetically sealed sender container 21 comprised of a sender case 20 and a cover plate 24. An optional bushing 26 rigidly attaches the distal end 22 of the helical bellows 18 at the base of the sender case 20. An end hole 28 communicates through the bushing 26 to allow fluid communication from the pressure vessel into the internal volume of the helical bellows 18. Changes in the difference in fluid pressure within and without the helical bellows 18 extends and retracts, rotating its proximate end 23 within the hermetically sender container 21.

To explain, the helical bellows 18 is conventionally formed with a substantially cylindrical surface creased by a plurality of helical corrugations 32. Helical bellows 18 thus resembles a low-pitch, multi-lead, hollow screw. Low helical pitch angles, with a relatively high number of turns, and an elongated slender shape are preferred for enhancing rotary displacement of the proximate end 23 of the helical bellows 18 while minimizing elongation. However, a larger cross section area may be necessary to increase force generated by the pressure difference within and without the bellows 18, so the length to diameter ratio of the helical bellows 18 is necessarily a compromise and should be optimized for the particular application. A slotted shaft 34 is attached to the proximate end 23 of helical bellows 18. Shaft 34 includes a coaxial end bore 36 that accepts support shaft 38 integral with cover plate 24. Support shaft 38 maintains the coaxial alignment of the slotted shaft 34 and helical bellows 18 with the rotational axis of sender unit 14C. An alignment pin 40 on a magnet support plate 42 engages the longitudinal slot 44 of shaft 34. Support plate 42 is secured to a sender magnet 46 and prevents magnet 46 from rotating with respect to shaft 34 while permitting longitudinal axial displacement of shaft 34. Although sender magnet 46 is shown as being disk shaped, many alternative shapes are possible. A compression bearing 48 is located between an annular bearing shoulder 25 within the sealed sender container 21 and magnet support plate 42 for urging the magnet support plate 42 and associated magnet 46 assembly against a thrust bearing 50 and the cover plate 24. Accordingly, magnet assembly 46 carried by the support plate 42 with the alignment pin extending into the longitudinal slot 44 of shaft 34 is free rotate with shaft 34 as the helical bellows 18 extends and retracts rotating its proximate end 23 responsive to changes in the pressure difference (ΔP) within and without the bellows 18.

FIG. 2 also shows a reader unit 16C that senses the direction of the magnetic field produced by magnet 46 and hence the orientation of sender magnet 46 using crossed induction coils 52 to sense and resolve orthogonal components of the magnetic field produced by magnet 46, or more particularly gradients of orthogonal components of the magnetic field produced by magnet 46 experienced by the reader unit 16c as sender unit 14C sweeps through substantially coaxial alignment with reader unit 16C as the tire/wheel rim 10/12 revolves. In particular, a pair of induction coils 52, are preferably crossed at approximately right angles to define a sensing plane oriented perpendicularly with respect to a central axis of symmetry which coincides with the rotation axis of slotted shaft 34 of the sender unit 14c as it sweeps past the reader unit 16c revolving with the tire/rim 10/12. For installations where sender unit 14C and reader unit 16C do not move through substantially axial alignment, an optional third induction coil (not shown) oriented substantially orthogonally relative to the sensing plane of the crossed pair of induction coils 52 may be employed to unambiguously determine the direction of sender magnet 46. Electrical connections 54 carry electrical signals induced in respective induction coils 52. For protection, the entire reader unit can be encased or potted within optional enclosure 56.

Figure 3:
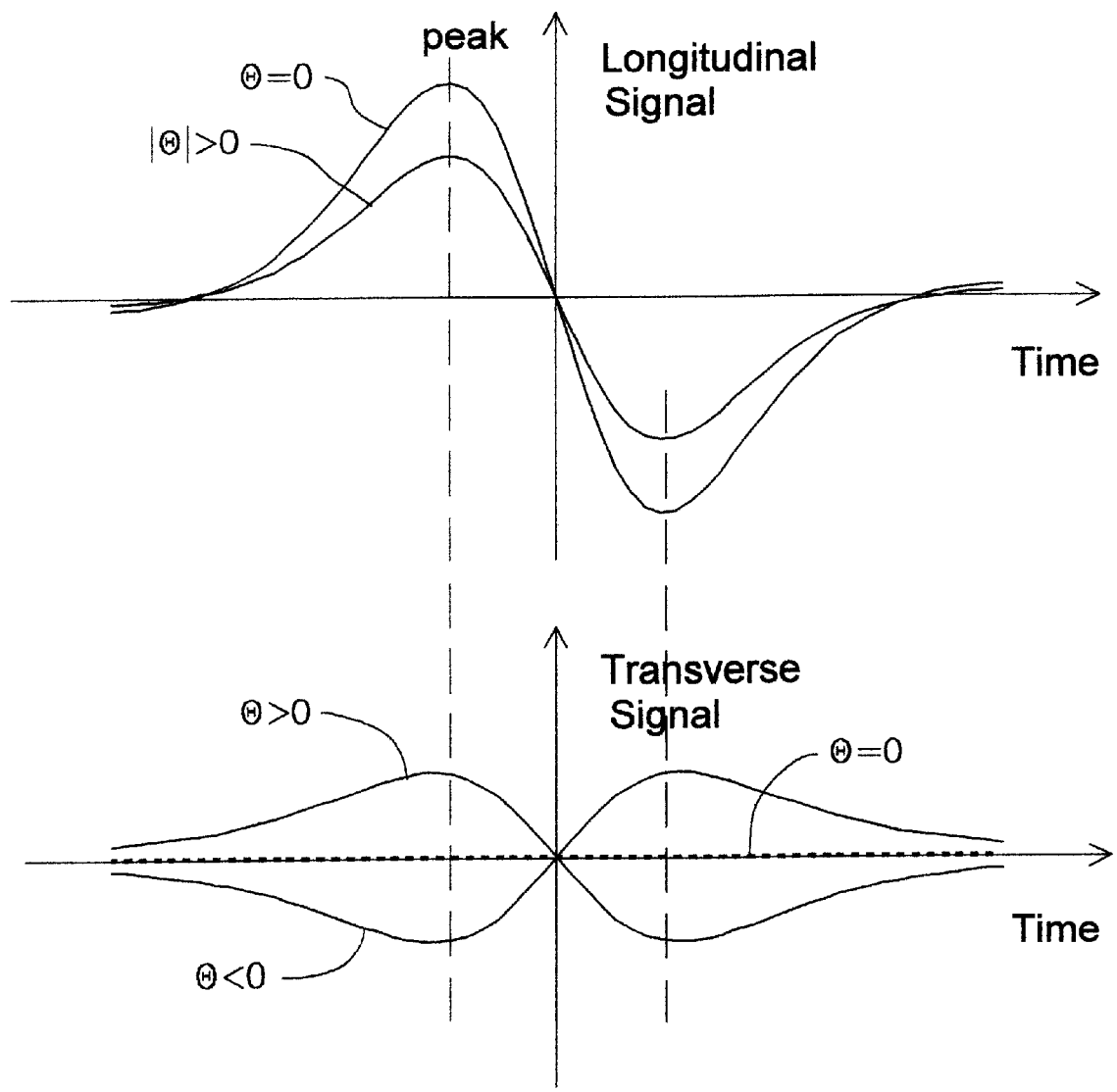
FIG. 3 illustrates the general nature of signals induced in the crossed induction coils of the magnetic field direction sensor for magnetic field oriented at various angles with respect to the crossed induction coils.

Induction coils 52 are effectively self-energized, generating electrical signals induced by the changes in the magnetic field intercepted by the respective coils emanating from the magnetic assembly 46 as the sender unit 14C sweeps by the reader unit 16C. FIG. 3 illustrates the general nature of the signals induced in crossed induction coils 52 as a function of orientation of the magnetic field with respect to the respective orthogonally crossed axes of the coils 52. The nature of these signals is described in more detail below. The signals induced in the induction coils 52 of reader unit 16c are processed and displayed by well-known and conventional electronic means such as a microcontroller (not shown) for determination of the orientation of the sender magnet assembly 46. The orientation of magnet 46 is interpreted or correlated to pressure.

The embodiment shown in FIG. 2 relies on relative motion between sender units 14A/4B and the corresponding reader units 16A/16B. For static situations where the sender and reader units do not move rapidly or appreciably with respect to one another, multiple crossed Hall-effect or multiple crossed magnetoresistive sensors (not shown) may be employed for sensing orthogonal magnetic field components and thus determine the orientation of sender magnet assembly 46. In general, three Hall-effect or magnetoresistive sensors oriented preferably (but not necessarily) along substantially orthogonal axes are required. However, in situations where the rotation axis of slotted shaft 34 of sender unit 14C and axis of symmetry of the reader unit 16C can be substantially coaxially oriented, the number of orthogonal Hall-effect or magnetoresistive sensors may be reduced from three to two.

Optionally, high magnetic susceptibility materials can be used in coils 52 to increase magnetic flux linkage the external field emanating from the magnetic assembly 46 of the through the coils with sender unit 46 and thus increase the strength of the induced signals. Indicial marks 58, 59 and 60 can be placed on the sender case 20, the pressure vessel wall 30a and reader unit case to help align sender and reader units 14C and 16C.

Pressure vessel wall 30A need not necessarily be composed of a non- or weakly-magnetically material. For vehicle pneumatic tire applications, steel wires are commonly employed as belting materials. Although steel wires may in some cases attenuate the magnetic field provided by, and even affect, to a degree, orientation of the magnetic assembly 46 of the sender unit 14c, an appreciable magnetic field will emanate without a significant directional change through thin layers of ferromagnetic materials such as sheet steel tire belts typically of most pneumatic tire walls. Moreover, the affects of the materials in the vessel/tire walls are systemic meaning that they would not change to any significant degree the sensed signal as the sender unit 14c revolving with the tire sweeps by the reader unit 16c multiple times per second. In particular, with multiple sensed signals per unit time, well known signal processing systems exist capable of detecting significant deviations in the orientation of the magnetic field emanating from the sender unit 14c indicating a pressure change.

Additional and Alternative Embodiments

Figure 4:
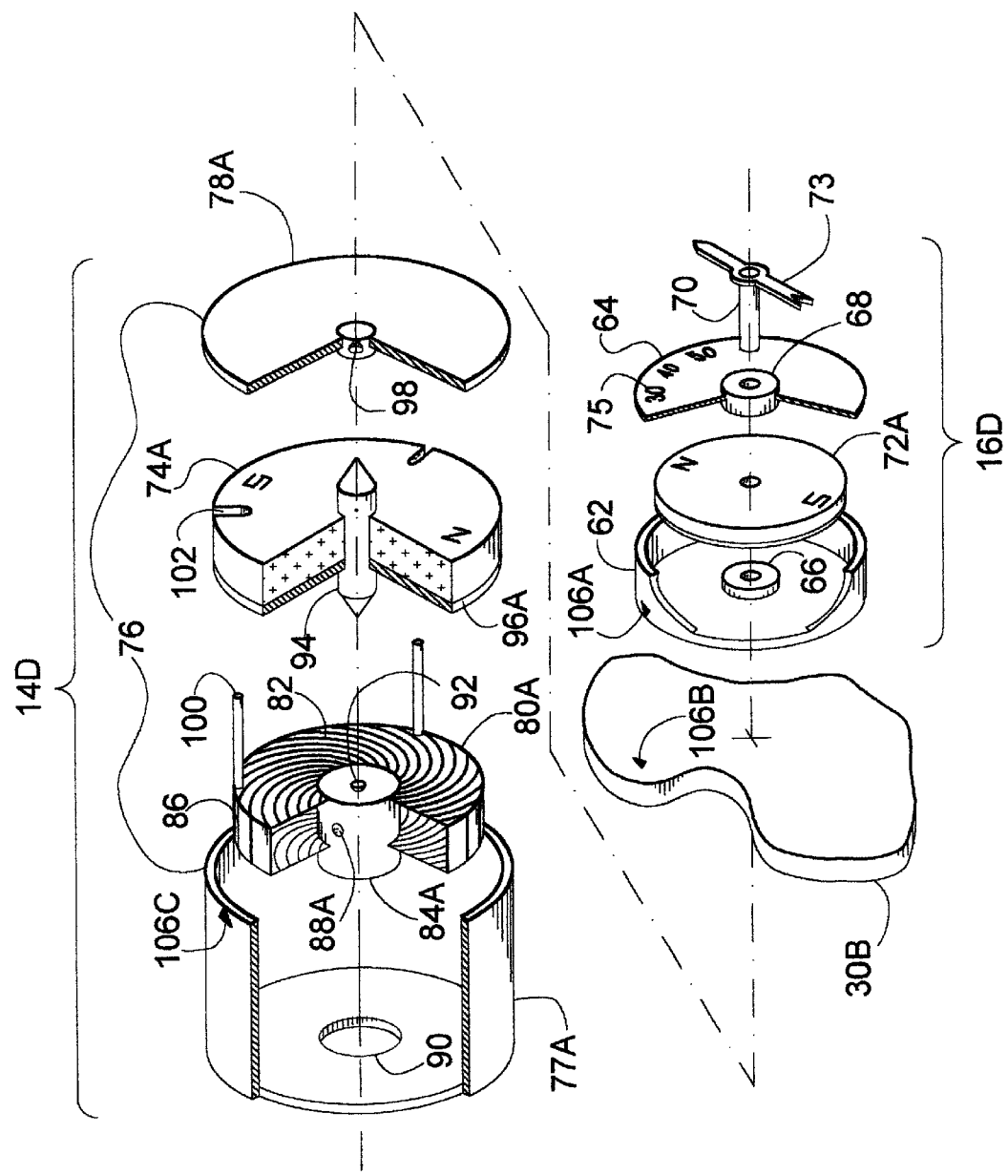
FIG. 4 is an exploded and cut away perspective view of an embodiment of the invented magnetically coupled pressure gauge employing an internal spiral faced bellows rotating an internal (sender) magnet as a pressure transducer coupling through the vessel wall to orient an external (reader) magnetic for indicating pressure.

FIG. 4 is an exploded and cut-away perspective view showing an alternative stationary embodiment of a pressure sender unit 14D and a magnetic reader unit 16D separated by a wall 30B of a pressure vessel.

Reader unit 16D includes a cylindrically shaped casing 62, a reader cover 64, and respectively an aft bearing 66 and a fore bearing 68. Again, both the reader casing 62 and reader cover 64 are made preferably of non- or weakly-magnetic materials. Reader unit 16D may be hermetically sealed for protection. Aft and fore bearings 66 and 68 support a reader shaft 70 coaxial or substantially parallel to the axis of the casing 62. A permanent reader magnet 72A and a pointer 73 are attached to the reader shaft 70. In the absence of extraneous magnetic fields, such as the earth's field, the reader magnet 72A rotates with shaft 70 to align itself substantially parallel with the N-S axis (with reversed poles) of the sender magnet 74A. [An explanation of offsetting error compensating affects of extraneous magnetic field on the respective orientations of the magnetically coupled sender and a reader magnets is described later.] Dial markings 75 calibrated in pressure units can be placed on the reader cover 64. Reader magnet 72A could also be combined with the pointer or be marked directly in pressure units.

Sender unit 14D includes a sender casing 77A and sender cover 78B providing hermetically sealed, pressurized sender case 76 enclosing the pressure transducer mechanisms. The casing 76A and cover 78B are preferably composed of non- or weakly-magnetic materials. Here the pressure transducer mechanism is a cylindrically shaped, spiral-faced bellows 80A. Where the pressure within the sender casing 76A is effectively zero, spiral-faced bellows 80A can function as an absolute pressure sensor.

Figure 5:
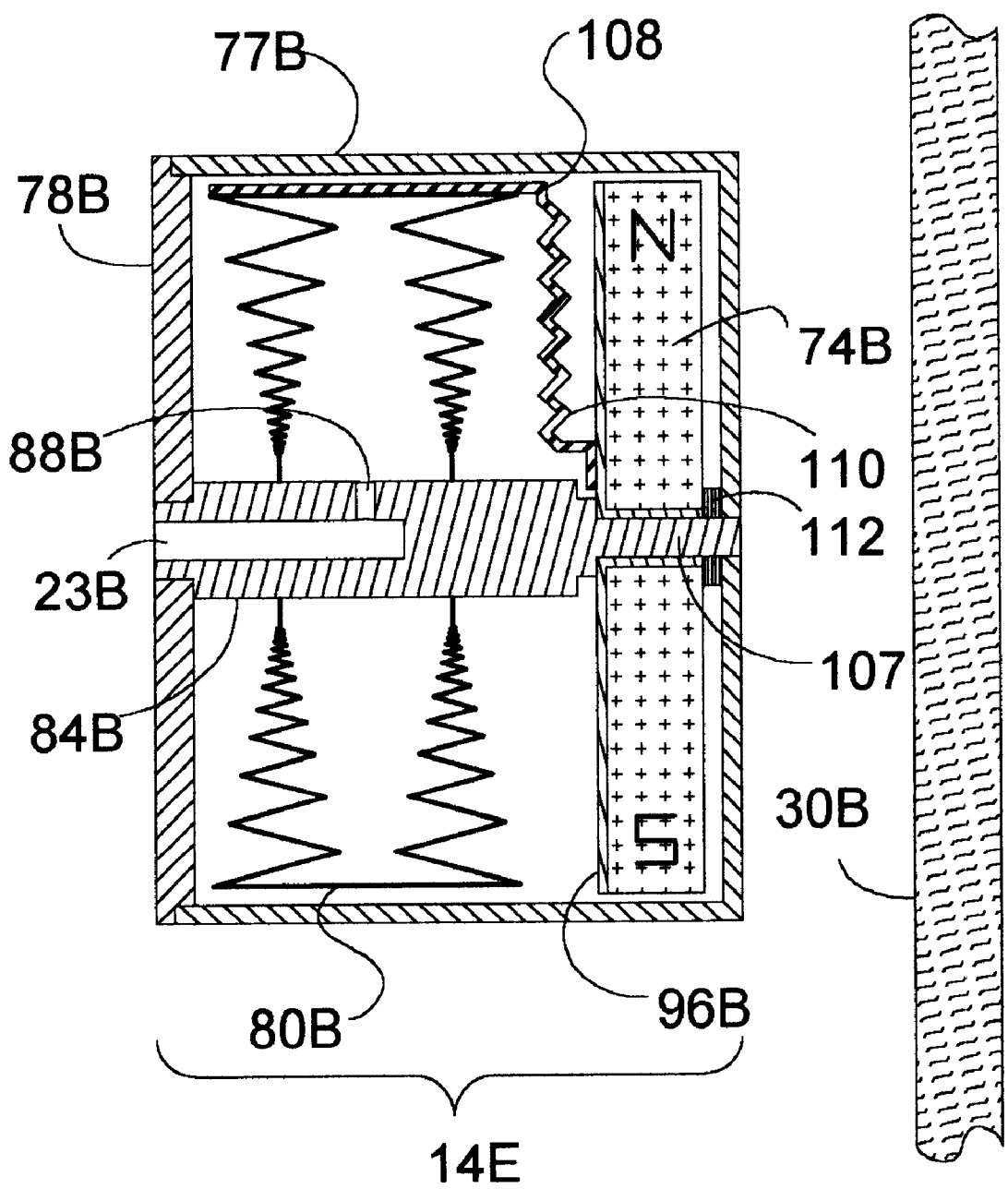
FIG. 5 is a cross-section of an embodiment of the invented magnetically coupled pressure gauge using a internal magnet coupled for rotation by a flexible spider to a spiral faced bellows as a pressure transducer.

In particular, looking at FIGS. 4 and 5, both end faces of the spiral-faced bellows 80A have a plurality of spiral stiffeners 82. The spiral stiffeners 82, shown as corrugations in the figures could increase in both depth and width with distance measured in the spiral direction outward from a supporting hub 84A. Stiffeners 82 are carried over into longitudinal stiffeners 86 across the peripheral cylindrical surface of spiral faced bellows 80A. A hub 84A anchors interior of the spiral faces of the bellows 80A A small hole 88A communicates radially into the radial hole connecting with an axial bore passage 28B for allowing fluid communication (pressure) between the interior of spiral-faced bellows 80A and the pressure vessel through (See FIG. 5). Hub 84A is rigidly secured to and does not rotate relative to the sender casing 76A. Spiral-faced bellows 80A is also rigidly attached and hermetically sealed onto hub 84A. The proximal end of hub 84A has a bearing bore 92 that engages and supports a distal end of sender shaft 94. Sender permanent magnet 74A is rigidly secured to sender shaft 94. Although sender magnet 74A is shown as being disk shaped, many alternative shapes are possible. Sender magnet 74A may also be supported by an optional support plate 96A. The proximal end of sender shaft 94 engages bearing 98, which is secured to the sender cover 78A. Adjustment means (not shown) may be provided at bearing 98 to vary and adjust the axial force on sender shaft 94. At least one pin 100 is attached to spiral-faced bellows 80A at or near its periphery. Pin 100 engages a diametric slot 102 in the sender magnet 74A (and/or optional magnet support plate 96). Index marks 106A, 106B & 106C may be used to help align the sender unit 14D and reader unit 16D during installation.

The spiral-faced bellows 80A respond to fluid pressure differences Δp within and without the bellows, causing the spiral-faced bellows 80A to expand and contract, rotating its cylindrical periphery relative to the stationary hub 84A. Pins 100 camming in the slots 102 couple the rotational displacement of the cylindrical periphery of the spiral-faced bellows 80A to the support plate 96A and sender magnet 74A. The skilled pressure transducer designer should note the torque capacity of such spiral face bellows due to changes in pressure can be quite large because of the relative magnitude of pressure affected surface areas of the bellows.

The embodiment of the sender unit 14E shown in FIG. 5 differs from that shown in FIG. 4, in that the hub 84B has an integral stationary shaft 107 extending between the cover 78B and the bottom of the casing. In this embodiment, the sender magnet 74B is supported for rotation around the stationary shaft 107 by a bearing member 96B. A flexible spider 108 attached to the periphery of bellows 80B, couples to the bearing member 96B preferably with a plurality of spokes 110. As the peripheral cylindrical surface of the bellows 80B diametrically expands, rotating relative to the hub 84B, the spider 108 couples that rotary displacement to the bearing member 96B and sender magnet 74B, while permitting expansion of bellows 80B. Spider 108 also resiliently holds magnet support 96B against thrust bearing 112.

Looking back to FIG. 4, interaction between extraneous magnetic fields (such as the geomagnetic field) and those of the sender and reader magnets can produce torques affecting the orientation of the respective magnets, particularly where reader magnet 74A has a strong field. Such extraneous field magnetic fields similarly affect outputs of magneto-resistive and Hall effect sensors.

One technique for mitigating the effects of extraneous magnetic fields is to provide a relatively stiff pressure transducing mechanism. To explain, the pressure transducing element should provide large magnitude torques responsive to changes in Δp, and have a corresponding large magnitude resisting/restoring torque, or spring constant. For a pressure transducing to produce a large magnitude torques, and corresponding resisting/restoring torques, it must have a large effective pressure transducing or actuating areas. Both spiral-faced bellows and helical bellows provide such large effective areas. This approach is particularly suited for embodiments the where the sensing unit includes induction coils that generate signals responsive to magnetic field changes, and therefore far are more sensitive to pulsing magnetic field changes provided by a sender magnet field revolving within a tire/tire than slow relatively steady geomagnetic field changes.

The better mechanism for reducing, canceling, or compensating for affects of extraneous magnetic fields is through careful balancing of the sender and reader magnets. This is possible because when magnetically coupled, the sender and reader magnets have opposite polarity and therefore any torque due to an extraneous magnetic field tends to rotate the respective magnets oppositely.

Also the spring constant of the bellows and the field strength of the sender magnet can be correlated. In general, however, because the spring constant or restoring force of the bellows necessarily must resist the force due to a maximum expected pressure difference, the affect of extraneous geomagnetic fields will not be significant.

Figure 6:
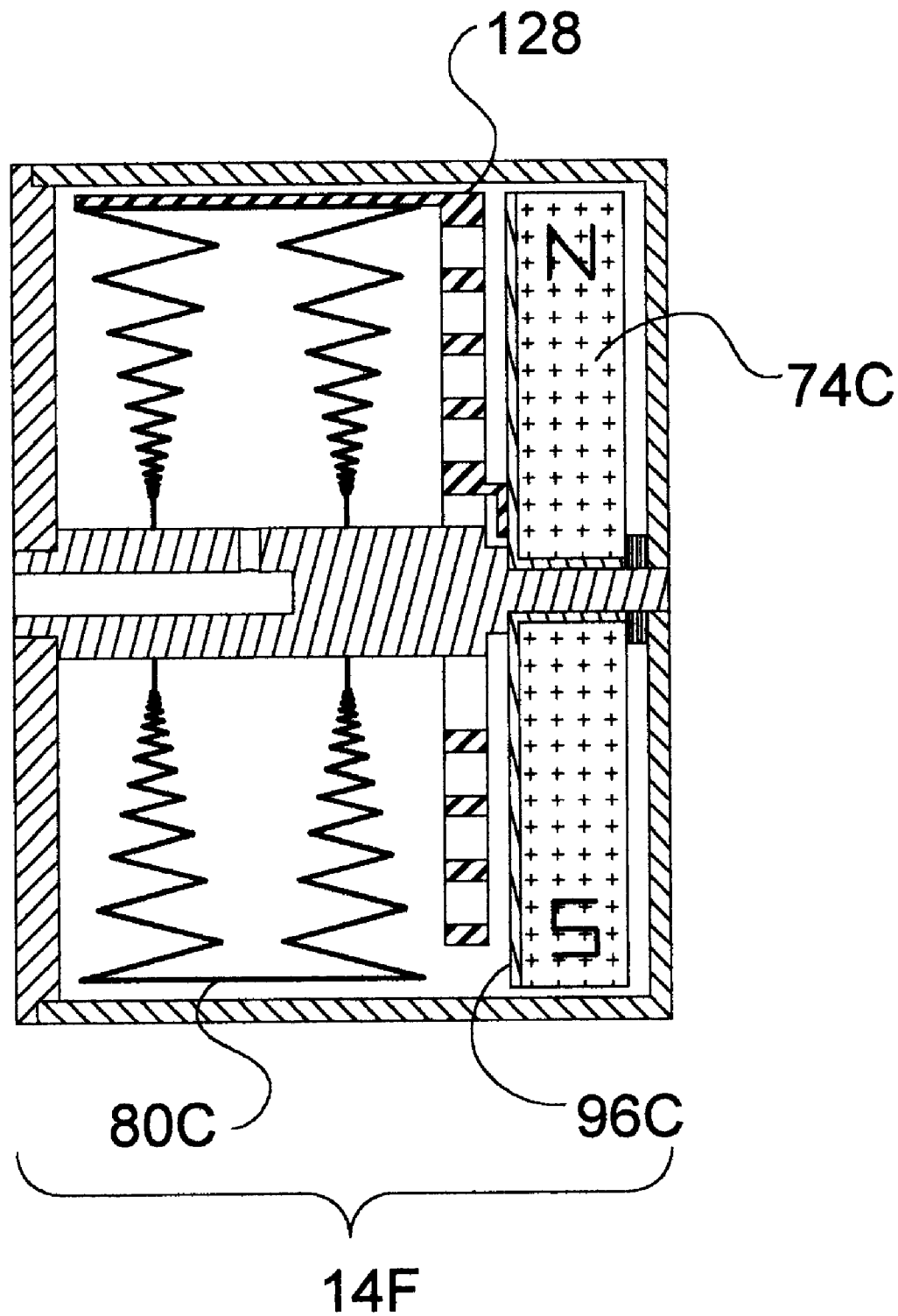
FIG. 6 is a cross-section of an embodiment of the invented magnetically coupled pressure gauge using a internal magnet coupled for rotation by a torsion spring and a spiral faced bellows.

FIG. 6 shows a third embodiment of a spiral-faced bellows sender unit in which a torsion spring 128 couples between the periphery of spiral-faced bellows 80c and magnet support plate 96c. The torsion spring 128 effectively decouples the restoring spring constant of the bellows 80c from the sender magnet 74C. In this embodiment the compliance of torsion spring 128 permits sender magnet 74C and sender magnet support 96C to rotate with respect to the periphery of spiral-faced bellows 80C. Sender unit 14F is otherwise identical to sender unit 14E shown in FIG. 5. A similar decoupling torsion spring coupling can be substituted for the alignment pin 40 and-slotted shaft coupling mechanism between the helical bellows 18 and support plate 42 holding the sender magnet 46 shown In FIG. 2.

Figure 8:
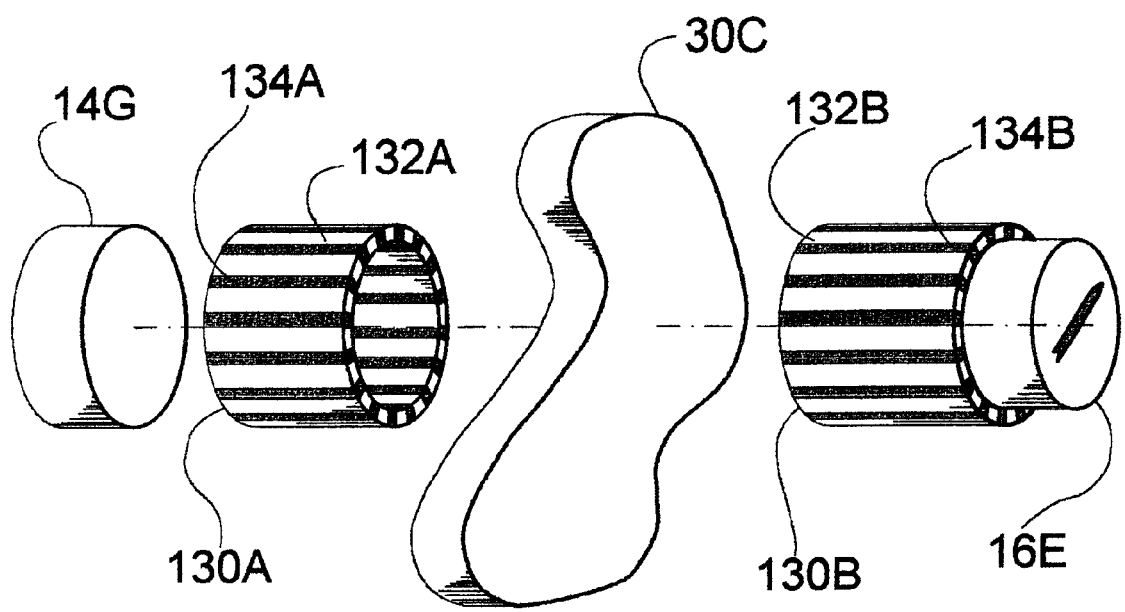
FIG. 8 is perspective view of magnetic flux shaping mechanism for an embodiment of the invented magnetically coupled pressure gauge.

FIG. 8 shows an another embodiment the invented magnetically coupled pressure gauge that uses flux-guiding elements 130A and 130B to increase operating distance between a sender unit 14G and a reader unit 16E. Flux-guiding elements 130A and 130B are comprised of alternating high-permeability (e.g., ferromagnetic) elements 132A and 132B and low-permeability elements 134A and 134B. Low-permeability elements 134A and 134B can be air gaps. The respective flux-guiding structures are substantially coaxial with the sender unit 14G and reader unit 16E. They may be installed on either or both sides of the pressure vessel wall 30C. Flux-guiding structures 130A and 130B may also envelop either or both sender 14G unit or reader unit 16E, or be abutted to them, as suggested in FIG. 8.

Figure 9B:
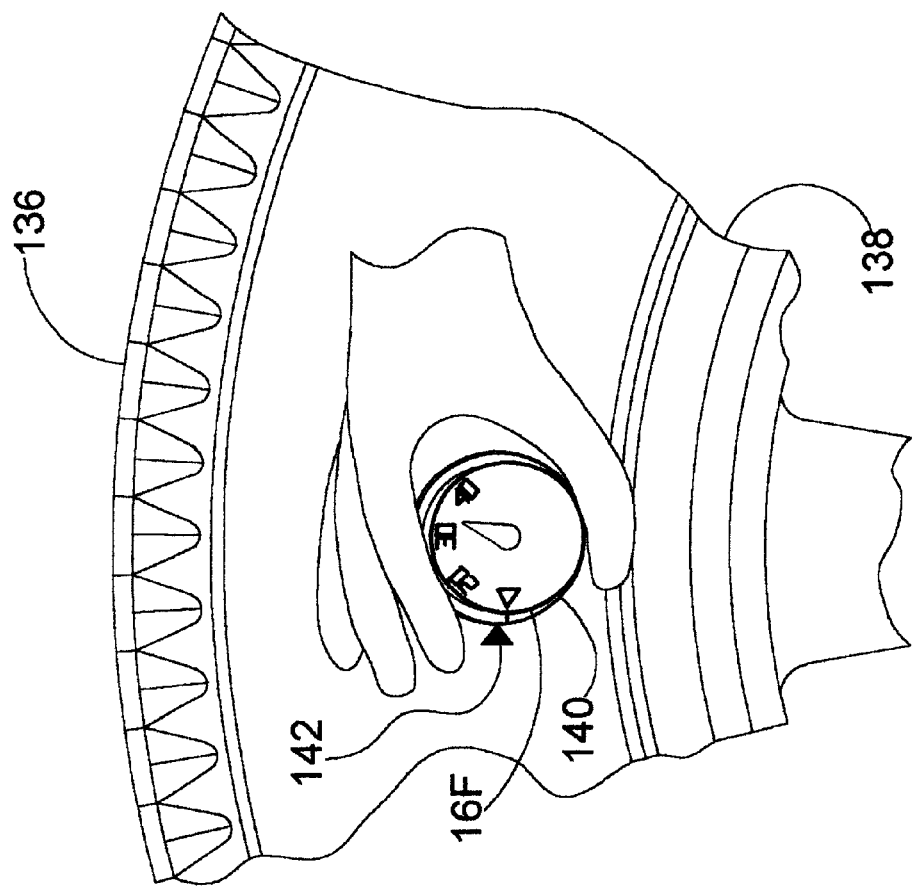
FIGS. 9A & 9B show an embodiment of the invented magnetically coupled pressure gauge including an internal, tire mounted pressure sender and a detached manual sensor reader.
Figure 9A:
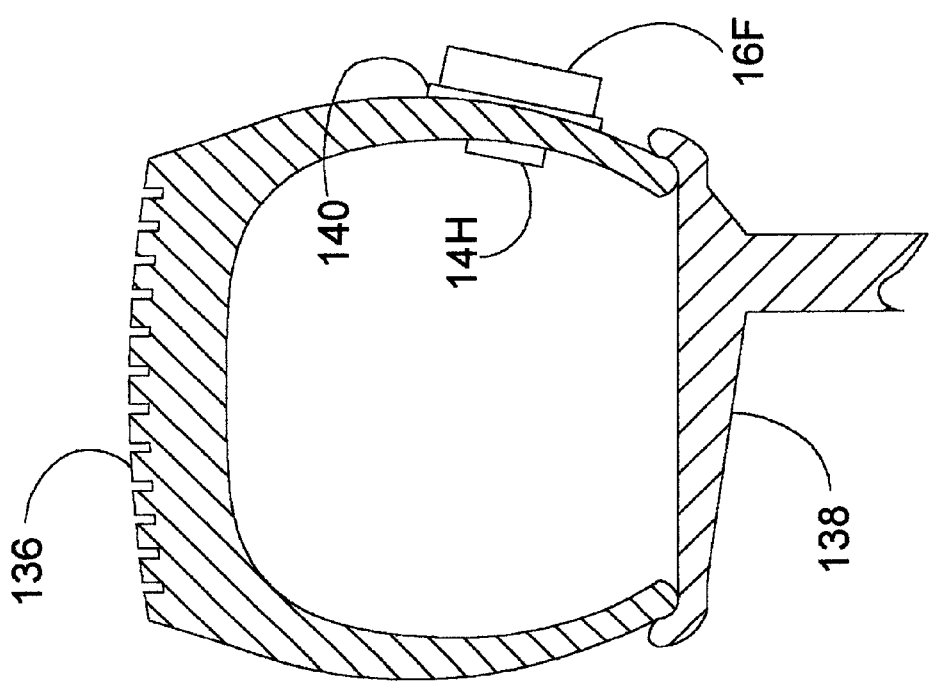

In FIG. 9 an embodiment of the invented magnetically coupled pressure gauge is shown that contemplates a manually located gauge for reading pressure of pneumatic vehicle tire without penetrating or requiring any fluid communication into tire. Here Sender unit 14H is permanently attached to or molded into the inner sidewall of a vehicle tire 136. Tire 136 is shown mounted on wheel rim 138, which together comprise a pressure vessel. Sender unit 14H can be quite small—less than ½ inch in diameter, for example. A person desiring to measure the tire pressure merely holds the reader unit 16F against the tire. Indicial markings, such as a raised ring 140 and fiducial mark 142 may be molded on the exterior surface of the tire to show where and how the reader unit 16f is to be placed and oriented. Alternatively, sender unit 14H may be mounted on the inner surface of wheel rim 138.

Operation—Preferred Embodiment

Referring to FIGS. 1 & 2, pressure sender unit 14A or 14B and reader unit 16A or 16B translate relative to each other, although not absolute required, preferably the axes of the sender and reader units should be substantially coaxial at the moment of closest approach between the sender and reader units. Such relative motion will induce voltage and current signal pulses in the crossed induction coils 52 in reader unit 16C. (FIG. 2) The relative strength of the induced signals in each of the induction coils 52 is a function of the angle between the respective induction coil axes and the sender magnet field direction as it sweeps by the reader unit 16C.

FIG. 3 illustrates the general nature of the signals induced in induction coils 52 versus time as the tire and wheel motion translates a sender unit past the crossed induction coils 52 in reader unit 16C. Shown are the "transverse" and "longitudinal" signals, which may correspond respectively to the components of the sender magnetic field along the direction of tire rotation and across the direction of tire rotation. Angle Θ) is measured between the direction of tire rotation and the sender magnetic field. Those skilled in sensing and measuring magnetic fields should appreciate that the "longitudinal" and "transverse" signals need not be the actual signals induced in induction coils 52. They can be electronically derived from the actual induced signals if induction coils 52 are arbitrarily oriented with respect to the tire and wheel. The "longitudinal" signal is maximized when Θ≈0. The "transverse" signal in approximately zero when Θ≈0 and increases in magnitude when Θ≠0. The ratio of "longitudinal" and "transverse" signals induced in the crossed induction coils is approximately proportional to the tangent of the angle of the magnetic field in the plane of induction coils 52. These induced signals have distinctive waveforms that can be analyzed by a microcomputer or other means to report tire pressure.

It should also be appreciated that the ratio of the "transverse" to "longitudinal" signals is also substantially independent of sender magnetic field strength and wheel rotation rate. Magnetic field direction (tire pressure) is determined by approximating an arctangent from the ratio of signal magnitudes (or peaks signal strengths) of the reader coil signals, while paying attention to sign or polarity of the signal generated. Alternatively a more accurate calculation methods may utilize best fit approximations, and look up tables particularly in instances where the axes of sender unit 14C and reader unit 16C are not well aligned at closest approach. By accounting for the positive and negative signs (polarity) of the "longitudinal" and "transverse" signals, and the fact of multiple passes a full 360-degree rotation of the sender magnetic field can be resolved.

Referring again to FIG. 2, pressure communicating into helical bellows 18 through end hole 28A into optional bushing 26 causes bellows 18 to expand (or contract) lengthwise and diametrically. This expansion causes the proximate end of the helical bellows 18 to rotate with respect to case 20 in proportion to the applied pressure. In turn, this rotation is coupled to magnet support plate 42A by alignment pin 40 engaging longitudinal slot 44. Slot 44 accommodates lengthwise expansion of helical bellows 18. Alternatively, a flexible member similar to flexible spider 108 or a torsion device similar to torsion spring 128 (FIG. 6) can serve in place of the slot-and-pin arrangement to couple rotation of its proximate end 23 while allowing for lengthwise displacement. Thermal expansion/contractions due to temperature proportionately changes both diameter and length of helical bellows 18, but does not significantly affect the running length of the helical corrugations. Accordingly, temperature changes produce little rotation, making the helical bellows 18 intrinsically, essentially insensitive to temperature change.

Operation—Additional and Alternative Embodiments

Looking at embodiments of the invented magnetically coupled pressure gauge having spiral-faced bellows (FIGS. 4, 5,& 6) air or any other fluid whose pressure is greater than that of the sealed interior of the sender unit 14D will enter bore 28B (shown in FIG. 5) and pass through hole 88A into the interior, expanding the spiral-faced bellows 80A. If the fluid communicated into the interior of the spiral-faced bellows 80A decreases, it will (or contract until the respective pressures equalize, i.e., pressure within of the pressure vessel equals that within the sealed sender casing 76. During expansion, spiral corrugations 82 move apart progressively, but their total running length cannot change appreciably (in other words, they straighten out somewhat). Accordingly, the periphery of spiral-faced bellows 80A rotates with respect to hub 84A, fixed to sender case 76A. The rotary displacement of the periphery of bellows 80A is coupled to the magnet 74A and optional magnet support plate 96A by pins 100 acting on slots 102. Slots 102 accommodate diametrical expansion of the spiral-faced bellows 80A. During contraction, spiral corrugations 82 wind up more tightly, rotating the magnet in the opposite direction. The direction of magnet rotation during expansion and contraction can be reversed by changing the clockwise or counter-clockwise sense of the spiral corrugations 82.

Referring to FIG. 5, spring spider 110 couples rotation of the periphery of bellows 80A to sender magnet support 96A and sender magnet 74A, which are otherwise free to rotate on shaft 107. Spider 110 also presses the magnet support 96A against thrust bearing 112. The direction of the magnetic field produced by the sender magnet 74A at the reader unit 16D rotates in synchronism with the orientation of sender magnet.

Figure 7:
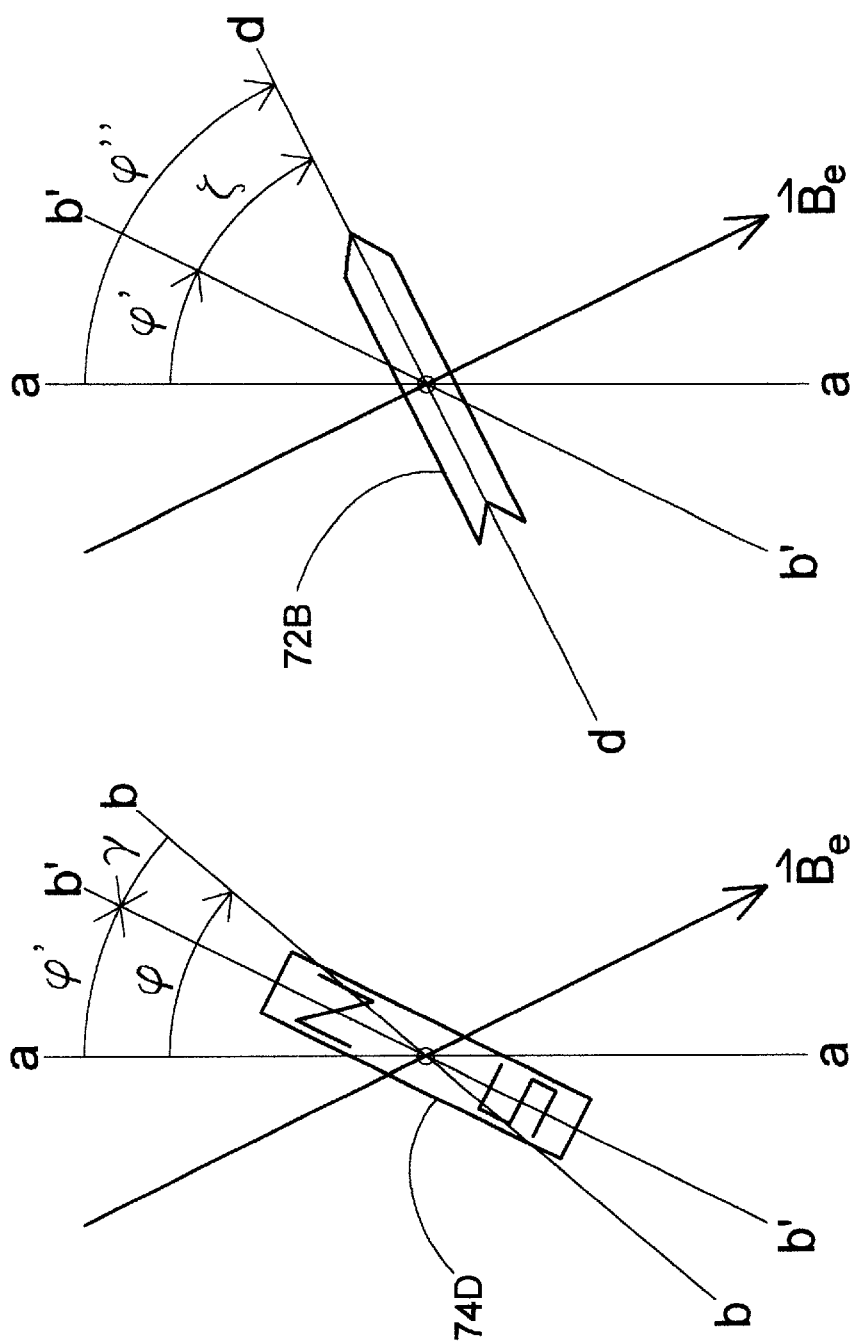
FIG. 7 is a plan view illustrating the effects of extraneous magnetic fields on the internal (sender) and the external (reader) magnets and a method for compensating for the effects of extraneous magnetic fields.

Referring now to FIG. 7, an approach that mitigates (minimizes) the affects extraneous magnetic fields on the invented magnetically coupled pressure gauge is explained in context of end view diagrams of a sender magnet 74D and a reader magnet 72B, both of which pivot at or near their centers. (Although the explanation using FIG. 7 is presented in the context of a pivoting reader magnet 72B, it applies equally as well to readers employing magnetoresistive or Hall-effect sensors responding to changes in steady state magnetic fields.)

As illustrated, in FIG. 7, sender magnet 74D is positioned rotationally at an angle ψ from reference line a—a to line b—b by a pressure transducing bellows absent any external magnetic fields. Assume a torque counter to that of the bellows mechanism, due to extraneous magnetic field, $B_e$, rotates the sender magnet 74D by an additional angle γ to line b'—b'. This counter torque is resisted by the effective spring constant of the bellows (spiral-faced or helical). The overall degree of rotation depends on the magnetic field strength of the sender magnet, the strength of the extraneous magnetic field, and the effective spring constant. Accordingly, sender magnet actually rotates an angle ψ' when pressure is applied.

Extraneous magnetic field, $B_e$, similarly affects the reader magnet 72B, except that the direction of rotation is opposite that affecting of sender magnet 74D, by an angle ζ. Thus reader magnet 72B lines up along line d—d. Those skilled in the analysis of magnetic fields will further appreciate that the respective sender and sensing magnetic filed align together in a least energy configuration with each other and any extraneous magnetic fields. Ideally, the respective fields of the sending and sensing magnets should be strongly coupled and oppositely directed in the absence of an extraneous field of comparable field strength.

In steady state (stationary) pressure vessel situations the classical T.V.M.D.C. analysis evolved during World War II for deriving compass headings in airplane navigation systems may be used for approximating an absolute direction of a magnetically coupled sender/sensor system rotated by a pressure transducing actuator.

In moving pressure vessel systems (pneumatic vehicle tires), variations due local external magnetic fields will cause relatively rapid fluctuations typical of least energy phenomenon about an equilibrium state. In contrast, variation due to more pervasive magnetic fields will tend to affect the equilibrium state of the coupled pair. In either instance, changes in rotational orientation of the coupled magnetic pair responsive to the pressure transducing actuator within the pressure vessel responding to increasing, or decreasing pressure will not only be in one direction, but also will be readily discernable as function of time.

Similarly, in embodiments of the invented magnetically coupled pressure gauge employing magnetoresistive or Hall effect sensors, in the absence of extraneous magnetic fields, the sensed direction of the magnetic field from the sender 74$d$ would aligned along line b—b. The actual sensed alignment at b'—b' rotated at Angle $\zeta$ from b—b likewise depends on least energy interactions with extraneous fields. And, again because of least energy phenomenon, changes in orientation of the field due to pressure changes will easily distinguishable from those due to variations arising from movement through local and pervasive extraneous fields.

In effect, by properly tailoring a spring constant of the pressure actuated bellows to the coupled field strength of the sender/sensor magnet systems, angles $\zeta$ and $\gamma$ can be made nearly equal, producing near-perfect error cancellation, especially when angles $\zeta$ and $\gamma$ are small.

Finally using flux-guiding structures 130A and 130B as shown in FIG. 8 can effectively channel magnetic flux even from external sources the source along the axis of a sender 14G unit to reader 16E unit. Assuming, a relatively stiff pressure transducing actuator, the added inertial mass of the flux guiding structures and the enhanced coupling of the respective fields of the sender and sensor elements can essentially eliminate sensitivity to magnetic field transients arising from extraneous fields.

Conclusions, Ramifications, and Scope

The invented magnetically coupled pressure gauges described are simple, passive, robust, compact, and accurate mechanisms for remotely sensing pressure within sealed pressure vessels. The invented gauges have the capacity for a large sensing range, both of pressure and in distance of remote coupling between sending and sensing units. They are not complex and eliminate the requirements to supply power within the pressure vessel. Most importantly tire pressure of motor vehicles can be easily, visually and otherwise monitored quickly and cleanly without any necessity for breaching the pressurized environment of the tire.

The invented magnetically coupled pressure gauges are described in context of representative, preferred and exemplary embodiments. The specifics of any particular embodiment should not be construed as limiting, but as merely providing detail illustrative of the scope of the discoveries and inventions made. For example, a induction coil powered by a provided or induced AC current could be substituted for the permanent sender magnet for emitting a time-varying magnetic field having a direction indicative of orientation of a pressure transducing. Crossed pickup sensing coils could resolve the emitted magnetic field direction, and, hence, report

I claim:

1. A magnetically coupled pressure gauge for indicating fluid pressure within a pressure vessel outside the pressure vessel, comprising in combination,
    (a) a rotatable sender means mounted inside of the pressure vessel for providing a rotatable magnetic field having a specific direction, the specific direction of the provided magnetic field rotating in a plane parallel to an axis of symmetry of the magnetic field;
    (b) a pressure actuated bellows mechanism also mounted inside of the pressure vessel coupled for rotating the sender means rotationally changing orientation of the specific direction of the magnetic field in the plane parallel to the axis of symmetry responsive to variations in fluid pressure within the vessel; and
    (c) sensor means mounted outside of the pressure vessel for sensing and indicating orientation of the specific direction of the magnetic field provided by the sender means in the plane parallel its axis of symmetry as rotated to a particular orientation by the pressure actuated bellows mechanism.

2. The magnetically coupled pressure gauge of claim 1 and further including, in combination therewith,
    (d) a hermetically sealed sender container secured inside of the pressure vessel to an interior pressure vessel wall surface containing:
        (i) the sender means providing the magnetic field mounted for rotation proximate the pressure vessel wall; and
        (ii) the pressure actuated bellows mechanism mounted for expansion and contraction within the sealed sender container; and
        (iii) means coupling between the bellows mechanism and the sender means for rotating the sender means upon expansion and contraction of the bellows mechanism,
        (iv) a fluid having a known pressure;
    (e) a pressure vessel fluid port communicating through a wall of the sender container into the pressure actuated bellows mechanism for allowing the bellows mechanism to expand and contract responsive to pressure differences ($\Delta p$) between the fluid inside of the hermetically sealed sender container and fluids inside of the pressure vessel and rotationally orient the specific direction of the provided magnetic field.

3. The magnetically coupled pressure gauge of claim 2 wherein the pressure actuated bellows mechanism comprises, a helical bellows having a proximate end and a distal end, its distal end being rigidly, and hermetically secured around, and in fluid communication with the pressure vessel fluid port, its proximate end rotating, extending and retracting toward and away from the sender means responsive to the pressure differences ($\Delta p$) for rotating the sender means.

4. The magnetically coupled pressure gauge of claim 2 wherein the pressure actuated bellows mechanism comprises a spiral-faced, annular bellows having an inner and an outer cylindrical periphery, the inner cylindrical periphery being hermetically secured, coaxially around a stationary cylindrical hub within the sealed sender container, the hub being hermetically secured around the pressure vessel fluid port, and having a fluid passageway communicating between the pressure vessel fluid port into the spiral-faced, annular bellows, the pressure differences (Δp) expanding and contracting the spiral-faced bellows rotating its outer cylindrical periphery relative to the stationary cylindrical hub.

5. The magnetically coupled pressure gauge of claim 1 or 2 or 3 or 4 wherein the sender means providing the magnetic field is a permanent magnet producing a magnetic field having axis of symmetry aligned with a north polarity end and a south polarity end of the magnet.

6. The magnetically coupled pressure gauge of claim 1 or 2 or 3 or 4 wherein the pressure vessel comprises a combination of an inflated, annular pneumatic tire hermetically sealed around a wheel rim for a vehicle.

7. The magnetically coupled pressure gauge of claim 1 or 2 or 3 or 4 and further including means for correlating the specific direction of the magnetic field provided by the sender means sensed by the sensor means to pressure within the pressure vessel.

8. The magnetically coupled pressure gauge of claim 2 or 3 or 4 wherein the hermetically seal sender container is evacuated having a fluid pressure less than one standard atmosphere and further including means for correlating the specific direction of the provided magnetic field sensed by the sensor means to pressure within the pressure vessel.

9. The magnetically coupled pressure gauge of claim 2 or 3 or 4 wherein the hermetically seal sender container is pressurized having a fluid pressure greater than one standard atmosphere and further including means for correlating the direction of the provided magnetic field sensed by the sensor means to pressure within the pressure vessel.

10. The magnetically coupled pressure gauge of claim 8 wherein the fluid pressure within the hermetically sealed sender container is less than a maximum expected pressure of a fluid contained within the pressure vessel and wherein the bellows mechanism includes a resisting/restoring elastic response opposing contraction of the bellows.

11. The magnetically coupled pressure gauge of claim 8 wherein the fluid pressure within the hermetically sealed sender container is greater than a minimum expected pressure of a fluid contained within the pressure vessel and wherein the bellows mechanism includes a resisting/restoring elastic response opposing expansion of the bellows.

12. The magnetically coupled pressure gauge of claim 9 wherein the fluid pressure within the hermetically sealed sender container is less than a maximum expected pressure of a fluid contained within the pressure vessel and wherein the bellows mechanism includes a resisting/restoring elastic response opposing contraction of the bellows.

13. The magnetically coupled pressure gauge of claim 9 wherein the fluid pressure within the hermetically sealed sender container is greater than a minimum expected pressure of a fluid contained within the pressure vessel and wherein the bellows mechanism includes a resisting/restoring elastic response opposing expansion of the bellows.

14. The magnetically coupled pressure gauge of claim 6 wherein:
    (1) the magnetic field provided by the sender means has north and a south polarity, and
    (2) the sender means is mounted with its axis of rotation perpendicularly intersecting the axis of symmetry of that field located midway between the north and south polarity of the provided magnetic field, and
    (3) the sensing means for sensing and indicating direction of the magnetic field provided by the sender means outside the tire and wheel rim pressure vessel includes a array of sensing coils, oriented about a sensing axis, the sensing axis being oriented essentially parallel to the axis of rotation of the sender means, the respective sensing coils each having a central coil axis extending radially to the sensing axis in a common plane; and
wherein the sensing means is mounted at a stationary position on the vehicle, proximate the tire and wheel rim, where the axis of rotation of the sender means revolving with the tire and rim sweeps through coincidence with the sensing axis of the sensing means as the tire and rim revolve.

15. The magnetically coupled pressure gauge of claim 7 wherein the specific direction of the magnetic field provided by the sender means is essentially parallel to the axis of symmetry of that magnetic field.

16. The magnetically coupled pressure gauge of claim 15 wherein:
    (1) the magnetic field provided by the sender means has north and south polarity, and
    (2) the sender means is mounted with its axis of rotation perpendicularly intersecting the axis of symmetry of that field located midway between the north and the south polarity of that field, and
    (3) the sensing means for sensing and indicating direction of the magnetic field provided by the sender means outside the pressure vessel includes a array of sensing coils, oriented about a sensing axis, the sensing axis being approximately parallel and coaxial with the axis of rotation of the sender means, the respective sensing coils each having a central coil axis radially extending to the sensing axis in a common plane.

17. The magnetically coupled pressure gauge of claim 15 wherein:
    (1) the magnetic field provided by the sender means has north and south polarity, and
    (2) the sender means is mounted with its axis of rotation perpendicularly intersecting the axis of symmetry of that field located midway between the north and the south polarity of that field, and
    (3) the sensing means for sensing and indicating direction of the magnetic field provided by the sender means outside the pressure vessel includes a array of magneto-resistive magnetic field sensors, oriented about a sensing axis, the sensing axis being approximately parallel and coaxial with the axis of rotation of the sender means.

18. The magnetically coupled pressure gauge of claim 15 wherein:
    (1) the magnetic field provided by the sender means has north and south polarity, and
    (2) the sender means is mounted with its axis of rotation perpendicularly intersecting the axis of symmetry of that field located midway between the north and the south polarity of that field, and
    (3) the sensing means for sensing and indicating direction of the magnetic field provided by the sender means outside the pressure vessel includes a array of Hall effect magnetic field sensors, oriented about a sensing axis, the sensing axis being approximately parallel and coaxial with the axis of rotation of the sender means.

19. The magnetically coupled pressure gauge of claim 6 wherein the pneumatic tire has indicial markings on its exterior surface indicating:

(1) where the sender means is located within the tire/wheel rim pressure vessel, (2) where the axis of rotation of the sender means is located and (3) a reference direction for the specific direction of the magnetic field provided by the sender means; and wherein the sensing means for sensing and indicating the specific direction of the magnetic field provided by the sender means outside the tire/wheel rim pressure vessel includes a sensor casing having exterior indicial markings corresponding to those on the exterior of the tire for manually locating, orienting and aligning the sensing means on the exterior tire surface, the sensing means sensing and indicating the specific direction of the magnetic field provided by the sender means relative to the reference direction indicated by the respective aligned reference direction indicial exterior markings on the tire and sensor casing.

20. The magnetically coupled pressure gauge of claim 15 wherein:

the magnetic field provided by the sender means has north and south polarity, and (1) the sender means is mounted with its axis of rotation perpendicularly intersecting the axis of symmetry of that field located midway between the north and the south polarity of that field, and (2) the sensing means for sensing and indicating direction of the magnetic field provided by the sender means outside the pressure vessel comprises, in combination, (i) a sensor casing located on an exterior surface of the pressure vessel immediately adjacent to the sender means mounted for rotation about a rotating axis within the pressure vessel, (ii) a permanent sensing magnet providing a sensing magnetic field with north and south polarity mounted for rotation within the casing about a sensing axis perpendicularly intersecting the magnet midway between the north and south polarity of the sensing magnetic field, the sensing axis being oriented in an approximately parallel and coaxial relationship with the axis of rotation of the sender means within the pressure vessel, whereby, the sensing magnetic field interacting with the magnetic field provided by the sender means rotates the permanent sensing magnet within the sensor casing into opposing polarity alignment with the magnetic field provided by the sender means indicating the specific direction of the magnetic field provided by the sender means.

21. The magnetically coupled pressure gauge of claim 1 or 2 or 3 or 4 and further including magnetic field flux guiding elements of alternatively high magnetic permeability elements and low magnetic permeability elements for preserving the specific direction the magnetic field provided by the sender means and magnetically coupling that field to the sensing means.

22. A method for externally sensing pressure of a fluid within a pressure vessel comprising the steps of:

(a) locating and mounting for rotation, a magnetic field source inside of the pressure vessel containing the fluid for providing a magnetic field having an axis of symmetry rotating in a particular plane;

(b) coupling the magnetic field source to a pressure actuated bellows also located inside of the pressure vessel expanding and contracting responsive to pressure differences Δp between fluid pressure inside the pressure vessel and a known fluid pressure, the expansion and contraction of the bellows rotationally orienting the axis of symmetry of the provided magnetic field in the particular plane inside the pressure vessel;

(c) sensing orientation of the axis of symmetry of the provide magnetic field outside the pressure vessel; and (d) correlating the orientation of the axis of symmetry of the magnetic field sensed to pressure within the pressure vessel.

23. The method for externally sensing pressure within a pressure vessel with a magnetic field of claim 22 and further including the steps of:

(e) encasing the magnetic field source and the pressure actuated bellows within a hermetically sealed container;

(f) pressurizing the hermetically sealed container with a fluid to a known pressure;

(g) establishing fluid communication from outside of the hermetically sealed container to inside of the pressure actuated bellows within the hermetically sealed container; and (h) integrating the hermetically sealed container with an interior pressure vessel wall surface inside of the pressure vessel.

* * * * *